Sept. 8, 1964 W. R. CARTER 3,148,253
FLOW RESPONSIVE CONTROL DEVICE
Filed April 10, 1962 2 Sheets-Sheet 1

INVENTOR
WILLIAM R. CARTER
BY
Williamson & Palmatier
ATTORNEYS

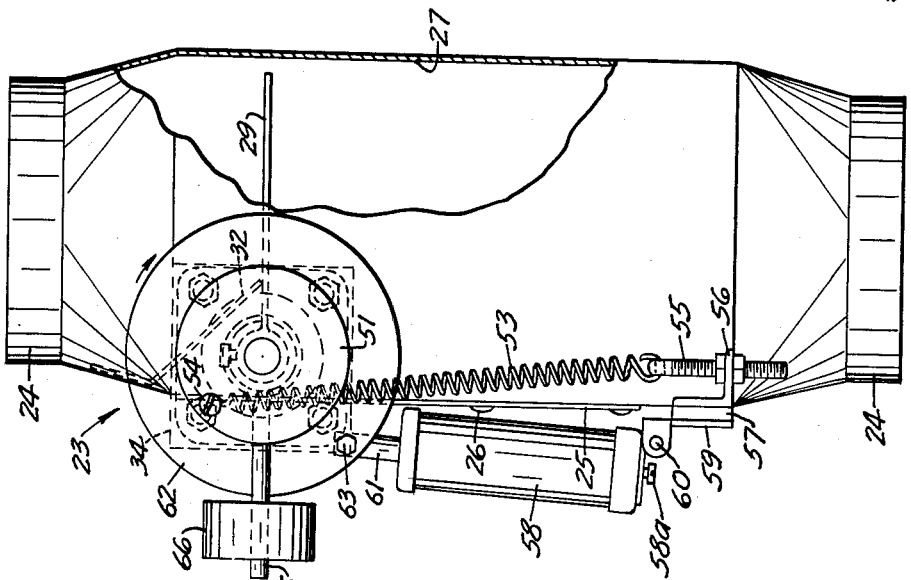
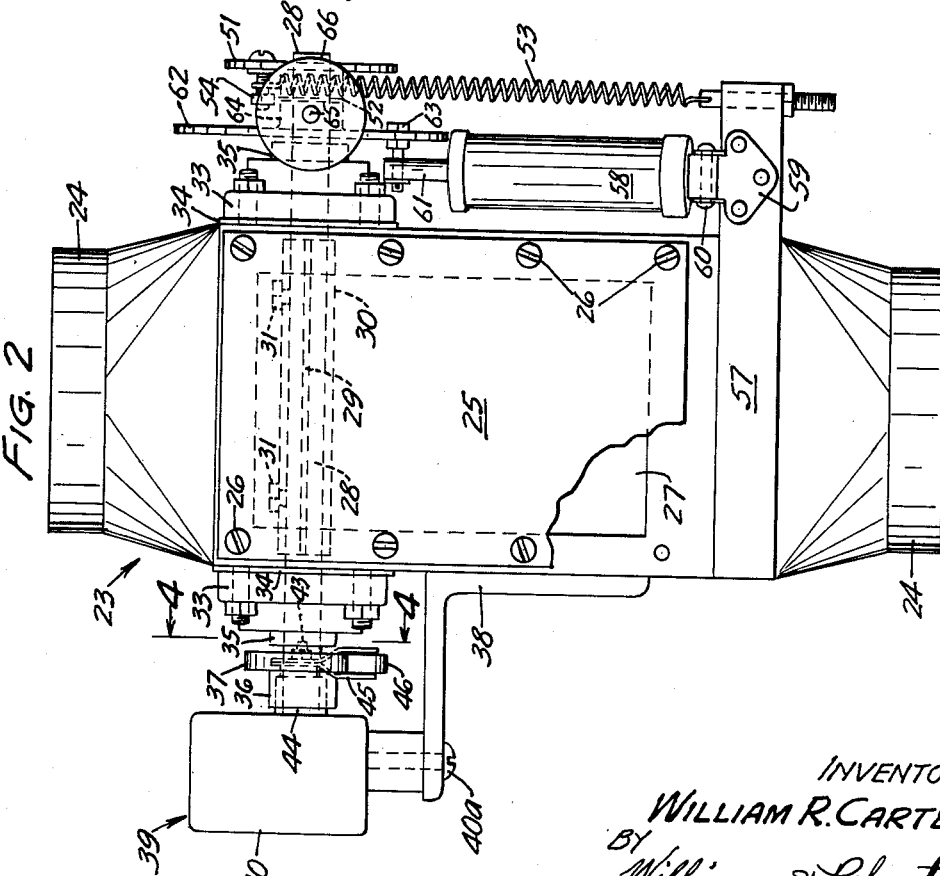

United States Patent Office 3,148,253
Patented Sept. 8, 1964

3,148,253
FLOW RESPONSIVE CONTROL DEVICE
William R. Carter, 5021 Wooddale Lane,
Minneapolis, Minn.
Filed Apr. 10, 1962, Ser. No. 186,517
4 Claims. (Cl. 200—61.21)

This invention relates to a flow responsive control device and more particularly to a flow responsive control device for controlling the operation of a material handling apparatus, such as a wheat tempering machine, stoner machine or the like, in response to changes in flow pressure of the supply stream of the particulate material to the apparatus.

An object of this invention is to provide a novel flow responsive control device, of simple and inexpensive construction, for use in controlling the operation of a material handling apparatus, such as a wheat tempering machine, stoner machine or the like, in response to changes in flow pressure of the supply stream of particulate material to the apparatus.

Another object of this invention is to provide a novel and improved flow-responsive control device for use in conjunction with various kinds of material handling apparatus, such as wheat tempering machines, stoner machines and the like, including valve means shiftable in response to changes in flow pressure of particulate material through the supply conduit of the apparatus for controlling operation of the same, and dampening means operable to delay closing of the valve means to thereby prevent rapid stopping and starting of the apparatus.

A more specific object of this invention is to provide a novel and improved flow-responsive control device, for use in controlling operation of material handling apparatus of the type used in processing particulate material, and including valve means for opening and closing the supply conduit of the material handling apparatus in response to changes in flow pressure of material through the supply conduit, the valve means being operable to actuate switch means arranged in controlling relation with the material handling apparatus, and adjustable pneumatic dampening means for use in delaying the closing of the valve means so that the undersirable rapid starting and stopping of the material handling apparatus is prevented.

Further, an object of this invention is to provide a novel and improved flow responsive control device in the class described which is operable in response to changes in flow pressure of particulate material through the supply conduit of a material handling apparatus to render the material handling apparatus inoperative when the supply to the apparatus is interrupted thereby greatly improving the operating efficiency of the material handling apparatus.

These and other objects and advantages of this invention will more fully appear from the following description made in connection with the accompanying drawings wherein like reference characters refer to the same or similar parts throughout the various views and in which:

FIG. 2 is a front elevational view of my invention;

FIG. 3 is a side elevational view of my invention with certain parts thereof broken away for clarity;

Figure 1:
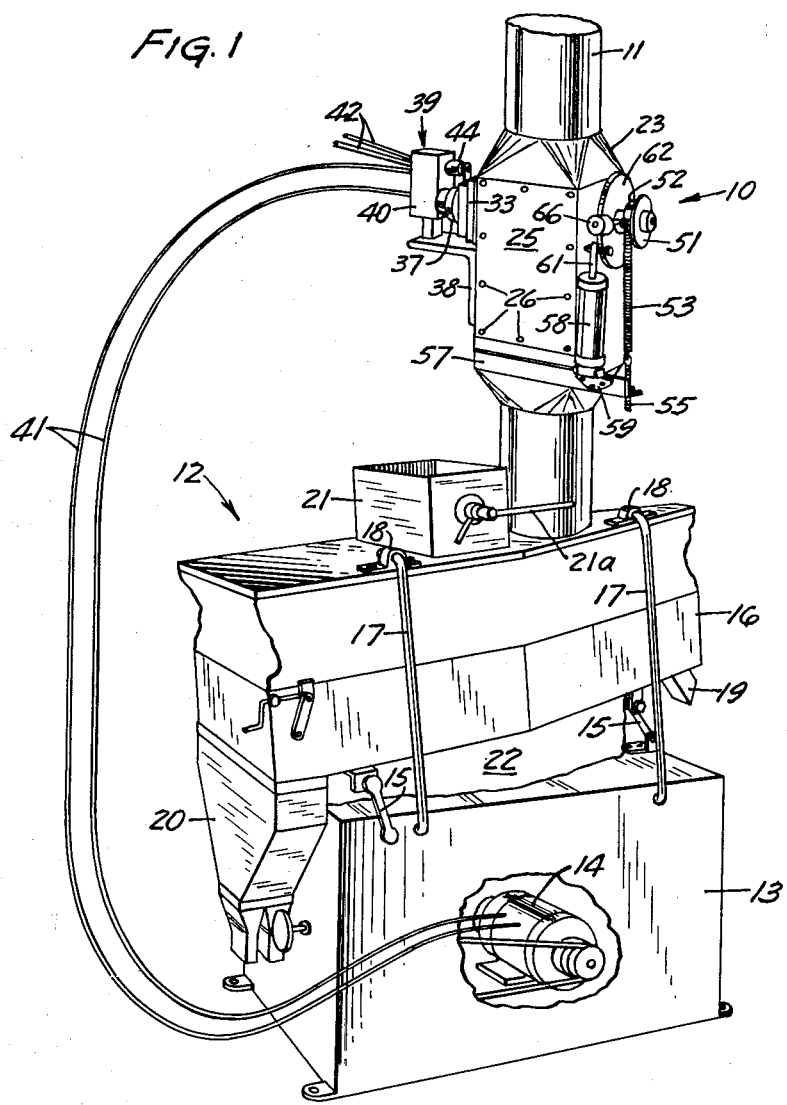
FIG. 1 is a perspective view of my invention illustrated in cooperating relation with a stoner type material handling apparatus.

Referring now to the drawings and more particularly to FIG. 1, it will be seen that one embodiment of my novel flow responsive control device, designated generally by the reference numeral 10, is illustrated in flow controlling relation with the supply conduit 11 of a material handling apparatus. The material handling apparatus, designated generally by the reference numeral 12, which is illustrated in close cooperative relation with the flow responsive control device 10 is a Forsberg vacuum stoner machine. This vacuum stoner machine includes a conventional housing 13 which is readily mountable upon any supporting surface which suitably houses the power means for agitating or reciprocating the shaker mechanism of the stoner machine. This power means is in the form of an electric motor 14 which is interconnected in driving relation by oscillating arms 15 to the shaker mechanism 16. The shaker mechanism 16 is shiftably supported for reciprocating or agitating movement relative to the housing 13 by means of a plurality of elongate support members 17. It will be noted that each of the elongate shaker mechanism support members 17 are pivotally connected at their respective upper ends as at 18 to the shaker mechanism 16 and are pivotally connected at their respective lower ends to the side walls of the housing 13. Thus, it will be seen that when the motor 14 is energized the shaker mechanism will be reciprocated by the oscillating arms 15 in a well known manner.

It will be noted that the shaker mechanism 16 is longitudinally inclined with the rear portion thereof disposed at a slightly higher elevation than the front portion. Although not shown in the drawings, a screen traverses the interior of the shaker mechanism 16 upon which the particulate material is discharged from the inlet conduit 11. The rear portion of the shaker mechanism 16 is provided with an outlet 19 through which are discharged the stones and other heavier material that are separated from the grain or the like. The front end of the shaker mechanism is provided with a grain discharge chute 20 through which pass the granular material after separation from the stones.

The shaker mechanism is entirely enclosed and the interior thereof is connected in communicating relation to a conduit 21 which is connectible to a conventional vacuum conduit, the latter being provided with a suitable fan apparatus (not shown) for creating a negative pressure or a partial vacuum in the shaker mechanism 16. In this connection it will be noted that the shaker mechanism 16 is connected in communicating relation with the interior of the housing 13 by flexible passage-defining connector 22. This flexible passage-defining connector member 22 is formed of a suitable impervious, flexible, material to accommodate the reciprocating movement of the shaker mechanism 16. It will also be noted that the conduit 21 is provided with suitable lever mechanism 21a for variously adjusting the flow of air therethrough whereby the negative pressure in the shaker mechanism 16 may be readily varied. It is pointed out that the particular construction of the Forsberg stoner machine does not, per se, constitute a part of the instant invention and a detail description of the construction and operation thereof is not thought to be necessary in the instant application.

During normal operation of the stoner machine 12, particulate material will be discharged through the supply conduit 11 into the shaker mechanism 16 and upon the screen which traverses the interior thereof. Energization of the motor 14 causes the machine to rapidly reciprocate and the fan apparatus to which the conduit 21 will be connected, will also be actuated so that a negative pressure is created within the interior of the shaker mechanism. The lighter particulate material which may be grain or the like will be moved downwardly along and above the surface of the screen towards the discharge outlet 20 while the heavier material such as stones or the like will be moved upwardly along the surfaces of the screen and will be ultimately discharged through the discharge outlet 19.

It is also pointed out that while the Forsberg stoner machine has been illustrated in combinative relation with the flow responsive control device, the latter is also applicable for use with various other material handling and processing machines and has particular application to wheat tempering machines.

In many of the conventional material handling machines such as vacuum stoner machines, wheat tempering machines and the like, the machines operate most efficiently when a predetermined amount of material is being continuously handled. Quite often, the amount of material supplied to the machines may vary, a condition which sometimes results in inefficient operation of machines with regard to the material being handled. For example, in the stoner machines such as the Forsberg stoner machine illustrated, if the supply of material which is normally discharged into the shaker mechanism is substantially diminished, a condition will result wherein the deck pattern of the granular material and the stones being separated upon the separator screen will be altered. This type of condition results in some of the granular material being moved upwardly to be discharged through the discharge outlet 19 along with the stones. It is, therefore, very desirable to render the shaker mechanism inoperative in the event that the supply of granular material thereto is substantially diminished.

To this end, the flow responsive control device 10 serves to control operation of a power means for the stoner machine in response to changes of flow pressure through the inlet conduit 11. It will be seen that the flow responsive control device 10 includes a valve chamber structure 23 which is interposed in communicating relation in the supply conduit 11 for the stoner machine 12. Actually the valve chamber structure 23 constitutes a section of the supply conduit 11 and the valve chamber structure is constructed of a suitable metallic material. The valve chamber structure 23 is preferably of rectangular configuration but the respective end portions of the valve chamber structure converge slightly and terminate in reduced annular ends 24 as best seen in FIGS. 2 and 3. One of the walls 25 of valve chamber structure 23 is detachably connected to the remaining portion of the valve chamber structure by suitable securing means such as screws 26. This detachable wall or plate 25 permits ready access to the interior or chamber 27 of the valve chamber structure 23.

Opposed side walls of the valve chamber structure 23 are suitably apertured. Extending through the valve chamber structure 23 and projecting outwardly of the apertured side walls is an elongate valve shaft 28. This valve shaft which is revolvable relative to the valve chamber structure 23 adjustably supports a valve member 29 for movement therewith. It will be noted that the valve member 29 has one edge portion thereof arcuately bent to define a sleeve or hub 30 which is positioned in coaxial relation upon the valve shaft 28. Suitable set screws 31 secure the hub or sleeve 30 in fixed relation with the shaft 28 to permit swinging movement of the valve member therewith. It will be noted that the valve member 29 is shiftable between a chamber closing position and a chamber open position. The set screws 31 also permit the valve member 29 to be adjusted relative to the shaft 28 whereby the precise disposition of the valve member when in the chamber closing and open positions may be varied.

It will also be noted that the valve chamber structure 23 has attached to the interior thereof an inclined baffle member 32 which projects downwardly and inwardly from the upper peripheral wall portion thereof. This baffle member 32 is engaged by the valve member 29 when the latter is in chamber closing relation as best seen in FIG. 3. It will also be seen that the inclined baffle member 32 also overlies the hub 30 of the valve member and serves to generally direct the particulate material flowing through the inlet conduit against the upper surface of the valve member 29.

Referring now to FIG. 2, it will be seen that the valve chamber structure 23 is provided with a pair of bearing units 33 secured to the opposed side walls thereof and which serve to revolvably support the respective ends of the shaft 28. The bearing units are of substantially identical construction and each is secured to the respective side walls of the valve chamber structure by conventional bolt assemblies. In order to impart rigidity to that portion of the side walls which supports the bearing units 33, it will be seen that a pair of relatively small rectangular reinforcement plates 34 are secured to the side walls as by welding or the like. The valve shaft 28 also has a pair of stop collars 35 each being affixed adjacent opposite ends of the shaft and which serve to position and prevent axial movement of the shaft relative to the valve chamber structure 23.

One end of the shaft 28 is provided with cam means affixed thereto and this cam means includes a hub 36 having a cam element 37 affixed thereto. The hub 36 of the cam may be detachably secured to the shaft 28 by suitable set screw means which permits the cam element 37 to be adjusted relative to the shaft 28.

Referring again to FIGS. 1 and 2 it will be seen that one wall portion of the valve chamber structure 23 has an L-shaped bracket 38 secured to the exterior surface thereof. A micro-switch mechanism 39 is detachably secured to the L-shaped bracket 38 by means of a suitable bolt 40a. The switch mechanism 39 is a micro-switch preferably type EX-AR, class 1, group C and D; class 2, group E, F and G and which is manufactured by Minneapolis-Honeywell, Inc. The switch mechanism 39 is comprised of a housing 40 constructed of die cast aluminum alloy. The various elements comprising the micro-switch housing 39 are located interiorly of the switch housing 40 completely sealed from the exterior thus making the switch mechanism explosion-proof.

Referring again to FIG. 1, it will be seen that the switch mechanism 39 is connected to an electric motor 14 by suitable conductors 41 while conductors 42 connect the switch to the fan mechanism (not shown) used to produce the negative pressure in the shaker mechanism 16. Thus it will be seen that the micro-switch mechanism 39 is arranged in circuit-controlling relation with respect to the power means for the shaker mechanism 16 and the mechanism associated therewith. Actuation of the micro-switch mechanism 39 serves to open and close the circuit in the electric motor 14 and to the fan apparatus associated with the stoner machine 12. It is pointed out, however, that in some instances it may be desirable to arrange the micro-switch mechanism in circuit controlling relation with the electric motor only. The deck pattern on the screen of the shaker mechanism is primarily disturbed by the reciprocating action of the shaker mechanism when the volume of material fed thereto is substantially diminished.

Figure 4:
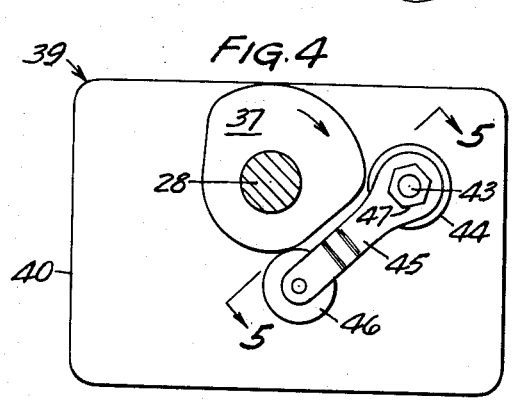
FIG. 4 is a vertical sectional view on an enlarged scale taken approximately along line 4—4 of FIG. 2 and looking in the direction of the arrows.
Figure 5:
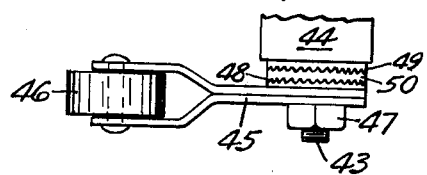
FIG. 5 is a detail view on the same scale as FIG. 4 taken approximately along line 5—5 of FIG. 4 and looking in the direction of the arrows.

Referring now to FIGS. 2, 4, and 5, it will be seen that the micro-switch mechanism 39 is provided with cam follower means arranged in cooperating relation with the cam element 37 for causing actuation of the micro-switch mechanism. The micro-switch mechanism 39 is provided with a switch arm 43 which projects outwardly through a suitable bearing 44 integrally formed with the switch housing 40. The outer end of the switch-arm 43 is threaded, and keyed to the switch arm for rotation therewith is a roller support arm 45 which is bifurcated at its outer end to revolvably support a roller 46. The roller support arm is retained in place on the switch arm by means of a nut 47 which threadedly engages the threaded end of the switch arm 43.

The roller support arm 45 includes a hub 48 integrally formed therewith and this hub is provided with a serrated annular surface as best seen in FIG. 5. Positioned in bearing engagement with the bearing 44 is an annular positioning member 49 which is also mounted on the switch arm 43 for rotation therewith. This annular member 49 is also provided with an outwardly facing annular serrated edge which enmeshingly engages another annular serrated member 50, the latter also having a serrated outer surface engaging the serrated surface of the hub 48. The cooperative relationship of the serrated hub 48 and serrated members 49 and 50 permit the roller support arm to be adjusted and retained in adjusted position relative to the switch arm 43.

Referring now to FIG. 4, it will be seen that the roller 46 is disposed in engaging relation with the cam element 37 and is caused to oscillate or shift upon shifting movement of the cam element. When the valve member 29 is in the closed position, then the cam element 37 will be disposed at the position illustrated in FIG. 4. Upon movement of the valve member from the chamber closed position, the cam element will be rotated in the direction indicated by the arrow in FIG. 4 and will move the roller and roller support arm in a counterclockwise direction as viewed in FIG. 4. During the initial movement of the cam element 37 and the switch arm 43, the micro-switch mechanism will be immediately closed thus energizing the power means 14 and also the fan apparatus associated with the stoner machine if the switch mechanism is so connected to the fan apparatus. Resilient means are provided for normally urging the switch arm 43 in a clockwise or switch-closing direction as viewed in FIG. 4.

It is pointed out, however, that the cam element 37 is so arranged and constructed that the switch will be opened only during terminal movement of the roller support arm and roller in a clockwise direction. Accordingly, the micro-switch mechanism will be immediately opened during the initial movement of the valve member 29 as the same is moved in the chamber opening direction and the micro-switch mechanism will be closed during the terminal movement of the valve member in the chamber-closing direction.

A circular spring attachment plate 51 having a hub 52 is keyed to the opposite end of the valve shaft 28 for rotation therewith. The upper end of an elongate coil spring 53 is secured to attachment plate 51 by means of a bolt assembly 54 located in close proximity to the circumferential marginal edge portion thereof. The lower end of the coil spring 53 is secured to an axially adjustable threaded element 55, the latter threadedly engaging a bracket 56. The bracket 56 is rigidly connected to the valve chamber structure 23 by means of an elongate bar 57. Since the circular spring attachment plate 51 is keyed to the valve shaft 28, it will be seen that the spring tends to urge the valve member 29 in a chamber closing direction. The tension on the spring may be adjusted by loosening the set screw which keys the hub 52 to the shaft and thereafter rotating the circular spring attachment plate 51 relative to the shaft. Fine adjustment of the tension on the coil spring 53 may be accomplished by adjusting the threaded element 55 relative to the bracket 56.

Means are also provided for dampening or delaying the closing of the valve member 29 and this dampening means includes a pneumatic dash pot which is operable in one direction only. Referring again to FIGS. 2 and 3 it will be seen that the pneumatic dash pot includes a pneumatic cylinder 58 pivotally attached to a connecting bracket 59 by means of a pivot pin 60. The connecting bracket 59 is secured to the support bracket 56 by conventional securing means such as bolts or the like. A piston rod 61 has a conventional piston secured to one end thereof which in turn is positioned within a pneumatic cylinder 58 for axial movement relative thereto. The lower end of the cylinder 58 is provided with an adjustable valve screw element 58a for controlling the amount of pneumatic pressure in the cylinder 58 during axial retraction of the piston rod 61.

The upper end of the piston 61 is pivotally secured to a relatively large dash pot actuating plate 62 by means of a pivot connection 63. The dash pot actuating plate is of circular configuration and is provided with a hub 64 which in turn is keyed to the valve shaft 28. It will also be noted that the pivot connection 63 between the actuating plate 62 and the piston rod 61 is located adjacent the peripheral edge portion of the actuating plate. Since the dash pot acts in one direction only, that is in a valve-closing direction, the valve member 29 may be quickly moved from the chamber-closed position to the chamber-open position but the dash pot serves to dampen and delay movement of the valve member in the chamber closing direction.

Counter balance means are provided and cooperate with the coil spring 53 to normally urge the valve member 29 in a chamber closing direction. This counter balance means includes an elongate counter balance shaft 65 having one end thereof threadedly engaging a suitable threaded recess formed in the hub 64 of the actuating plate 62. A counter balance weight 62 having a threaded bore therein threadedly engages the threaded outer end of the shaft 65. It will be seen that when the valve chamber is moved to the chamber-open position, the return coil spring 53 will be tensioned and will cooperate with the counter balance weight 66 to urge the shaft 28 in a direction to return the valve member 29 to the chamber closed position. It should be pointed out that the return coil spring 53 has its upper end portion positioned in bearing engagement with the surface of the hub 52 of the attachment plate 51. During movement of the valve member 29 and the valve shaft 28, the coil spring 53 will be wound and unwound upon this hub member 52, the latter serving also as a guide for the spring.

During operation of the flow responsive control device 10, the device will be positioned in the supply conduit of a material handling device such as the stoner machine illustrated in FIG. 1 of the drawing. The valve member 29 will be normally disposed in the chamber closing position and when the granular material flows through the supply conduit 11, the flow pressure of the material against the upper surface of the valve member will urge the valve member in a chamber opening direction. In this connection, it is pointed out that the flow pressure must be sufficient to overcome the resistance of the return coil spring 53 and the counter balance weight 56. The piston rod 61 may be readily extended since resistance is offered only during retraction of the piston rod. Thus the valve member 29 will be quickly moved to the chamber-open position. During the initial movement of the valve member 29 in a chamber open direction, rotation of the shaft will cause corresponding rotation of the cam element 37 which in turn acting through the cam follower arm 45 and roller 46 will close the micro-switch mechanism 39. The motor 14 will be energized thus actuating the shaker mechanism of the stoner device 12. Agitation of the shaker mechanism 16 along with the stratification of the granular material and the stones will cause the stones to be discharged through the outlet 19 and the grain to be moved in the manner of a fluidized bed to the discharge outlet 20. The deck pattern on the separator screen of the shaker mechanism will be determined in part by the volume of material being handled by the stoner machine and if this predetermined volume is altered the deck pattern will be lost. The loss of the deck pattern, as pointed out above, results from a substantial reduction in the volume of granular material to be handled by the machine. This results in some of the granular material being lost through the discharge outlet 19.

In the event that the flow pressure of the material is reduced to a point so that the valve member 29 will be urged to the chamber closing condition, the micro-switch mechanism 39 will be opened. The co-action between the cam element 37 and the cam follower arm 45 is such that the micro-switch mechanism 39 will be opened only during the terminal movement of the valve member 29 in a chamber-closing direction.

The pneumatic air-dash pot serves to dampen and delay closing of the valve member and opening of the switch mechanism 39. The closing time delay of the valve member 29 will be determined by the operating condition of the dash pipe and the tension of the return spring 53. The dash pot can be readily adjusted by adjustment of the valve screw 58a and the tension on the return spring 53 may be increased or decreased by adjustment of the threaded element 55 or the adjustment of the attachment plate 51 relative to the shaft 58. Any one of the adjustments may be selectively made whereby the closing time of the valve member and actuating of the switch to open the circuit may be readily varied. Toward this end, it is pointed out that quick closing of the valve member 29 along with opening of the micro-switch mechanism 39 is undesirable since this produces a condition known as hunting, or rapid on and off operation. Therefore, the pneumatic dash pot means allows the closing time of the valve member and actuation of the switch to be predetermined.

When the valve member 29 is moved from the chamber-opened position to the chamber-closed position, power means 14 will be deenergized. In the event that the micro-switch mechanism is also connected in circuit controlling relation with respect to the fan apparatus associated with stoner machines when the fan apparatus will also be de-energized. It will, therefore, be seen that when the flow responsive control device 10 is used in conjunction with a vacuum stoner machine, the efficiency of the stoner machine is greatly increased.

The flow responsive control device is also particularly applicable in connection with wheat tempering machines and functions as the tempering water control. When so used, the flow responsive control device will be installed in communicating relation with the supply conduit of a wheat tempering machine. The supply conduit or spout supplies wheat to the tempering conveyor and the micro-switch will be connected in circuit controlling relation to the valve mechanism for controlling the flow of water into the tempering conveyor. Whenever the flow of wheat to the temper conveyor ceases, the supply of water to the conveyor will be automatically shut off and the flow responsive control device will also be operative to turn the water on again when the flow of wheat to the temper conveyor begins again. When so used with a wheat tempering machine, the flow responsive control device prevents excessive water from collecting in the tempering conveyor related and equipment when the wheat flow stops. It is also pointed out that my novel flow responsive control device may be advantageously utilized with gravity separators and when so used, will be interposed in flow controlling relation with respect to the supply conduit of such a gravity separator.

Although not shown in the drawing, it is pointed out that a signaling mechanism may also be used in combination with my novel flow responsive control device whereby opening or closing of the valve member 29 will actuate the signal mechanism. To this end, an audible or visual type signaling mechanism may be employed.

From the foregoing, it will be seen that I have provided a novel flow-responsive control device which may be readily employed with conventional material handling apparatus such as stoner machines, gravity separators, and wheat tempering machines or the like and which serves to control operation of such machines in response to changes in flow pressure of the material supplied thereto.

It will be seen from the preceding paragraphs that my novel flow-responsive control device is arranged and constructed to permit quick operation of the material handling apparatus when flow of the particulate material thereof starts but is operable to permit slow switch operation when the particulate product flow stops thereby preventing the undesirable rapid on and off operation of the material handling apparatus.

From the foregoing, it will be seen that my novel flow responsive control device is not only of simple and inexpensive construction but that the device functions in a more efficient manner than any heretofore comparable devices.

It will, of course, be understood that various changes may be made in the form, details, arrangement and proportions of the various parts without departing from the general scope of my invention.

What is claimed is:

1. A flow responsive control device for controlling the operation of an electrically power operated material handling apparatus in response to changes in flow pressure of a supply of particulate material flowing to the the apparatus, said flow responsive control device comprising,
   a valve chamber interposed in communicating relation in a supply conduit of a material handling apparatus employed in processing particulate material,
   a flow control valve member mounted within said chamber, a shaft structure journaled on said valve chamber and connected with said valve member to pivotally mount the same for pivotal movement between chamber-open and chamber-closed positons, said valve member being readily pivotal from a chamber-closed position extending transversely of the chamber to a chamber-open position in response to a predetermined flow pressure of particulate material thereagainst,
   adjustable means for normally urging said valve member to the chamber-closed position in the absence of a predetermined flow pressure of particulate material against said valve member, said means including an elongate tension spring member located exteriorly of said valve chamber and having one end thereof ancored with respect to said shaft structure and having the other end thereof connected with said shaft structure and wound thereupon, whereby said spring is progressively wound upon the shaft structure to cause tensioning thereof when said valve member is moved towards said chamber open position,
   electric switch control mechanism for controlling the operation of the material-handling apparatus and located exteriorly of and sealed from said valve chamber,
   means positioned exteriorly of said valve chamber engaging said switch mechanism and being connected with said shaft structure and being operable to close said switch mechanism during initial movement of said valve member in chamber-opening direction and opening said switch mechanism during the terminal portion of movement of the valve member in a chamber-closing direction,
   and a dash pot mechanism located exteriorly of said valve chamber interconnected with said shaft structure for causing dampening movement of the valve member in a chamber-closing direction only whereby closing of the switch mechanism will be delayed as as the valve member is moved in the chamber-closing direction.

2. The structure as defined in claim 1 and a baffle element mounted within said valve chamber for directing the flow of particulate material through said valve chamber and for limiting movement of the latter in a chamber-closing direction.

3. A flow responsive control device for controlling the operation of an electrically power operated material handling apparatus in response to changes in flow pressure of a particulate material flowing into the apparatus, said control device comprising,
   a valve chamber interposed in communicating relation in the supply conduit of a metallic material-handling apparatus such as a stoner machine, wheat tempering machine or the like, used in the processing of particulate materials, a flow control valve member mounted within said chamber for shifting movement between chamber-opening and chamber-closed positions, a shaft structure journaled on said valve chamber and pivotally mounting said valve member for pivotal movement from a chamber-closed position extending transversely of said chamber with a chamber-opened position and responsive to the predetermined flow pressure of particulate material thereagainst, an elongate coil spring member located exteriorly of said valve chamber and having one end thereof anchored with respect to said shaft structure and having the other end thereof interconnected with said shaft structure and wound thereon to normally urge the valve member to the chamber-closed position in the absence of a predetermined flow pressure of a particulate material against said valve member, said spring member being readily adjustable to vary the tension exerted thereby, an electrical switch mechanism for controlling operation of the material-handling apparatus and located exteriorly of and sealed from said valve chamber, said electric switch mechanism having a switch arm for opening and closing said switch mechanism, cooperating cam and cam follower elements positioned exteriorly of said valve chamber and mounted on said switch arm and shaft structure and being operable to close said switch mechanism during initial movement of said valve member in a chamber opening direction and opening said switch mechanism during the terminal portion of movement of said valve member in a chamber-closing direction, a substantially circular plate secured to said shaft structure for rotation therewith and being positioned exteriorly of said valve chamber, and pneumatic dash pot mechanism connected with said plate and cooperating therewith for causing dampening movement of the valve member in a chamber-closing direction only whereby closing of the electric switch mechanism will be delayed as the valve member moves in the chamber-closing direction.

4. The structure defined in claim 3 wherein said pneumatic dash pot mechanism is adjustable to selectively vary the delay of closing time of said valve member.

References Cited in the file of this patent

UNITED STATES PATENTS

| | | |
|---|---|---|
| 771,764 | Bousser | Oct. 4, 1904 |
| 1,784,493 | Meyer | Dec. 9, 1930 |
| 2,611,044 | Siemon | Sept. 16, 1952 |
| 2,998,549 | Meller | Aug. 29, 1961 |
| 3,065,316 | Olson | Nov. 20, 1962 |